(12) United States Patent
Kersey (10) Patent No.: US 7,155,074 B2
(45) Date of Patent: Dec. 26, 2006

(54) PRESSURE TRANSDUCER FEATURING LARGE DIAMETER OPTICAL WAVEGUIDE HAVING BRAGG GRATING AND BEING CONFIGURED FOR REDUCING THE BULK MODULUS OF COMPRESSIBILITY THEREOF

(75) Inventor: Alan D. Kersey, Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 177 days.

(21) Appl. No.: 10/458,795

(22) Filed: Jun. 9, 2003

(65) Prior Publication Data

US 2004/0037485 A1 Feb. 26, 2004

Related U.S. Application Data

(60) Provisional application No. 60/387,174, filed on Jun. 7, 2002.

(51) Int. Cl.
*G02B 6/00* (2006.01)
*G02B 6/34* (2006.01)

(52) U.S. Cl. .............................. 385/12; 385/37; 385/13; 385/125

(58) Field of Classification Search ................... 385/12, 385/13, 123–128, 37
See application file for complete search history.

(56) References Cited

U.S. PATENT DOCUMENTS

| | | | |
|---|---|---|---|
| 4,725,110 A | | 2/1988 | Glenn et al. |
| 4,807,950 A | | 2/1989 | Glenn et al. |
| 5,042,897 A | | 8/1991 | Meltz et al. |
| 5,061,032 A | | 10/1991 | Meltz et al. |
| 5,388,173 A | | 2/1995 | Glenn |
| 5,841,131 A | * | 11/1998 | Schroeder et al. ..... 250/227.17 |
| 6,201,912 B1 | | 3/2001 | Kempen et al. ............... 385/37 |
| 6,229,827 B1 | * | 5/2001 | Fernald et al. ................. 372/20 |
| 6,304,686 B1 | * | 10/2001 | Yamate et al. ................ 385/13 |
| 6,931,188 B1 | * | 8/2005 | Kersey et al. .............. 385/125 |
| 2002/0041724 A1 | | 4/2002 | Ronnekleiv et al. .......... 385/12 |
| 2004/0234221 A1 | * | 11/2004 | Kringlebotn et al. ....... 385/128 |

FOREIGN PATENT DOCUMENTS

WO    WO 99/32863    7/1999

\* cited by examiner

*Primary Examiner*—Kevin S. Wood
(74) *Attorney, Agent, or Firm*—Patterson & Sheridan, LLP (57) ABSTRACT

A pressure transducer has a cane waveguide geometry with "side-holes" in the cane waveguide cross-section that reduce the force required to compress the waveguide. The cane waveguide is a large diameter optical waveguide with a cross-section of at least about 0.3 millimeters, at least one inner core, a Bragg grating arranged therein, a cladding surrounding the inner core, and a structural configuration for providing a reduced bulk modulus of compressibility and maintaining the anti-buckling strength of the waveguide. The structural configuration reduces the cross-sectional area of the waveguide. These side holes reduce the amount of glass that needs to be compressed, but retains the large diameter. The waveguide responds to an optical signal, further responds to an external pressure that causes a differential strain across the inner core, for providing a Bragg grating optical-signal containing information about a birefringence of the Bragg grating that is proportional to the external pressure.

17 Claims, 4 Drawing Sheets

PRESSURE TRANSDUCER FEATURING LARGE DIAMETER OPTICAL WAVEGUIDE HAVING BRAGG GRATING AND BEING CONFIGURED FOR REDUCING THE BULK MODULUS OF COMPRESSIBILITY THEREOF

CROSS-REFERENCE TO RELATED APPLICATIONS

This application claims benefit to provisional patent application Ser. No. 60/387,174, filed Jun. 7, 2002 (CC-0286).

BACKGROUND OF THE INVENTION

1. Technical Field

The present invention generally relates to a transducer for sensing some physical parameter; and more particularly to a pressure transducer for sensing pressure using a differential pressure sensing technique.

2. Description of Related Art

Cane or large diameter waveguides having a diameter of at least 0.3 millimeters have proven to be useful elements for creating highly reliable tunable grating based elements, and appear to be suitable for a variety of other applications. One primary application of interest is pressure sensing. One of the issues associated with the use of gratings for monitoring pressure is the need to include a "reference" grating to remove the extraneous effects such as thermally induced shifts in the grating wavelength. There is a need in the art to accomplish this using a grating in a cane waveguide.

SUMMARY OF THE INVENTION

In its broadest sense, the present invention provides an new and unique approach for a differential "splitting" of a grating due to birefringence in a highly asymmetrical waveguide structure. The waveguide in this case is fabricated with two large holes symmetrically located on either side of the core. External pressure applied to this structure will cause splitting of the Bragg resonance of the grating. The extent of this splitting will be proportional to pressure. Thermal effects, on the other hand, will cause a common-mode shift in the Bragg wavelength. These side holes reduce the amount of glass that needs to be compressed, while retaining the important features of using the large diameter cane waveguide.

In particular, the approach is used to provide a new pressure transducer having a large diameter optical waveguide with a cross-section of at least about 0.3 millimeters, at least one inner core, a Bragg grating arranged therein, a cladding surrounding the at least one inner core, and a structural configuration for reducing the bulk modulus of compressibility and maintaining the anti-buckling strength of the large diameter optical waveguide. In operation, the large diameter optical waveguide responds to an optical signal, further responds to an external pressure that causes a differential strain across the inner core, for providing a Bragg grating optical signal containing information about a birefringence of the Bragg grating that is proportional to the external pressure. The birefringence of the Bragg grating proportional to the external pressure is independent of a change in temperature.

The structural configuration forms at least one side hole arranged in relation to the core of the large diameter optical waveguide and dimensioned for maintaining anti-buckling strength of the large diameter optical waveguide. The structural configuration may be formed in the cladding.

The at least one side hole may include two or more side holes symmetrically arranged about the inner core, may extend completely through the large diameter optical waveguide, or partially through the large diameter optical waveguide, and may be circular or non-circular.

The two side holes may have different diameters forming an asymmetrical large diameter optical waveguide structure.

The two side holes may have the same diameters and have substances or material with different coefficients of compressibility. In this embodiment, one of the two side holes may have a first fluid with one coefficient of compressibility, and the other of the two side holes may have a second fluid with a different coefficient of compressibility. Alternatively, the one of the two side holes may have a fluid with air bubbles therein for reducing the coefficient of compressibility of the substance, and the other of the two side holes may have the same type of fluid without air bubbles.

The foregoing and other objects, features and advantages of the present invention will become more apparent in light of the following detailed description of exemplary embodiments thereof.

BRIEF DESCRIPTION OF THE DRAWING

The drawing, not drawn to scale, include the following Figures.

BEST MODE FOR CARRYING OUT THE INVENTION

Figure 1:
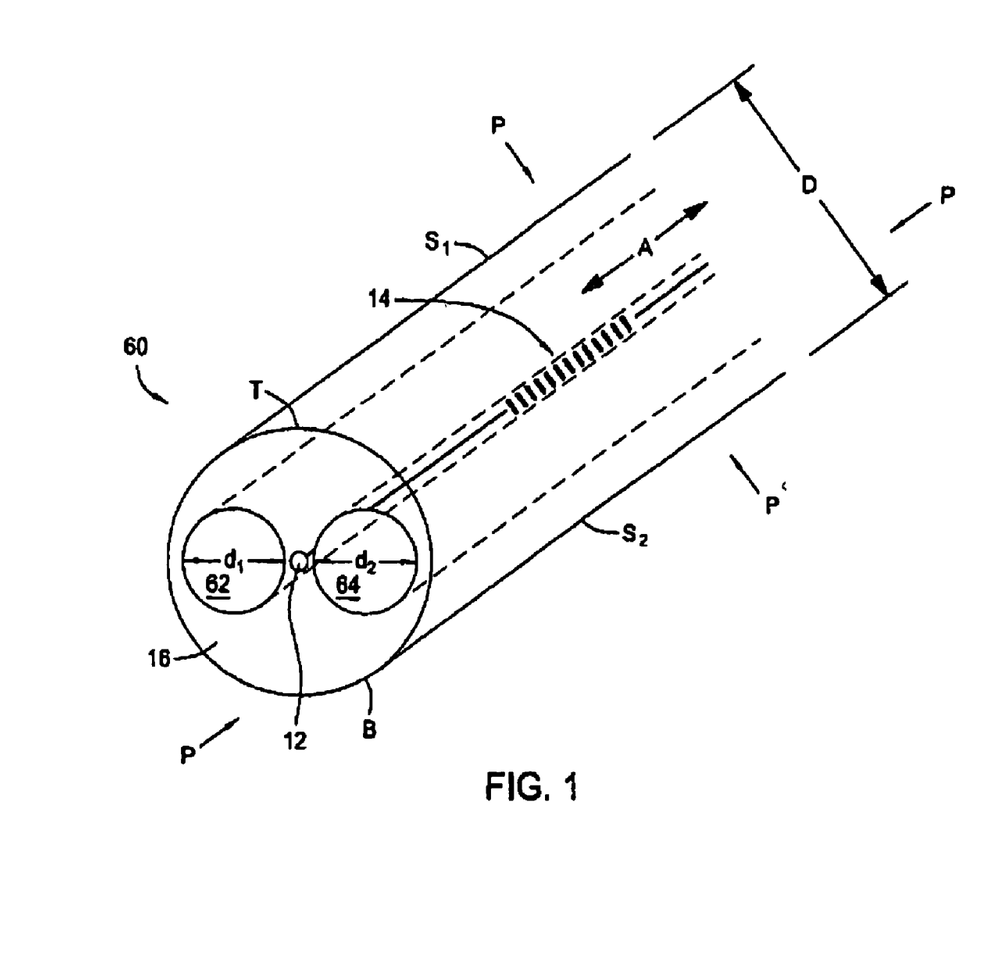
FIG. 1 is a diagram of a large diameter optical waveguide having two sides having different diameters that is the subject matter of the present invention.
Figure 2:
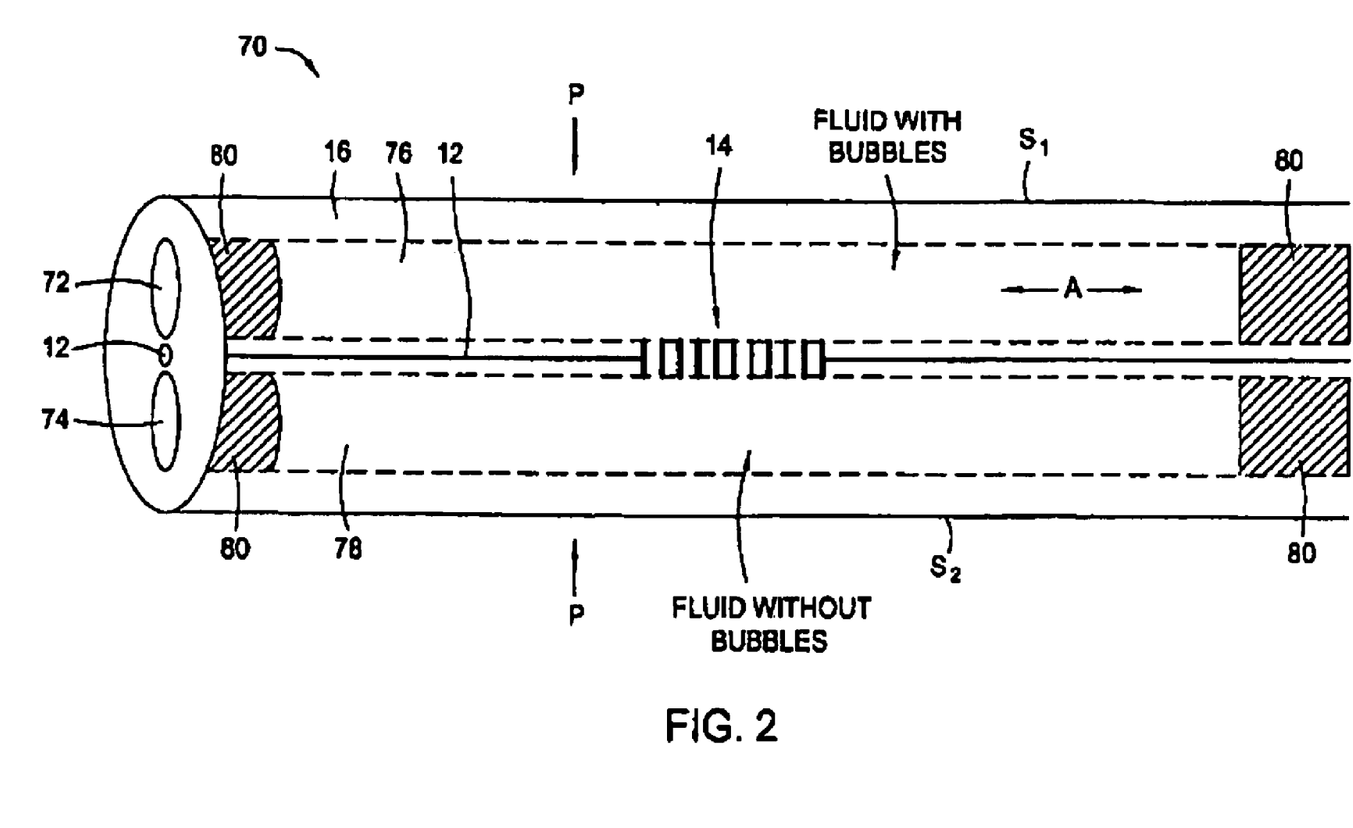
FIG. 2 is a diagram of a large diameter optical waveguide having two sides with the same diameter that is the subject matter of the present invention.

FIGS. 1, 2a, 2b:

Pressure Sensing Using Differential Splitting

A desired application of the cane or large diameter waveguide is to use it for pressure sensing. The present invention provides two side hole cane embodiments which achieve this objective.

In FIGS. 1 and 2, external pressure P applied to the large diameter optical waveguide or cane 60, 70 causes differential stress across the core 12 and thereby strong birefringence. The external pressure P is detected by the degree of "splitting" induced in the grating wavelength resonance as a result of the birefringence. This approach provides for a differential "splitting" of a grating 14 due to birefringence in a highly asymmetrical waveguide structure. The waveguides 60, 70 are fabricated with two large holes symmetrically located on either side of the core. External pressure applied to this structure will cause splitting of the Bragg resonance of the grating. The extent of this splitting will be proportional to pressure. It is important to note that thermal effects, on the other hand, will cause a common-mode shift in the Bragg wavelength.

FIG. 1: Pressure Transducer having Side Hole Waveguide

FIG. 1 shows a large diameter optical waveguide 60 having an inner core 12 with a Bragg grating therein and surrounded by a cladding 16 having two side holes 62, 64. The side holes 62, 64 are symmetrically located on either side of the core 12 and have different diameters $d_1$, $d_2$ forming an asymmetrical large diameter optical waveguide structure. The scope of the invention is also intended to include using side holes having the same diameter.

The side holes 62, 64 cause a differential splitting action of the large diameter optical waveguide 60 in response to an external pressure P. In other words, the left side $S_1$ having the side hole 62 with the larger diameter $d_1$ will axially compress along the longitudinal axis A of the large diameter optical waveguide 60 a different distance than the right side $S_2$ having the side hole 64 with the smaller diameter $d_2$, while the top and bottom sides generally indicated as T and B will compress substantially less than the left and right sides. The reason for this differential compression effect is that the side $S_1$ has a lower bulk modulus of compressibility than the side $S_2$ because the side $S_1$ has less material since more was removed to create the side hole 62, while the top and bottom sides T and B have no material removed. The differential splitting between the left and right sides $S_1$, $S_2$, and the top and bottom sides T, B causes the core 12 and the Bragg grating 14 therein to bow in response to a pressure change exerted on the large diameter optical waveguide 60.

For example, in operation the large diameter optical waveguide 60 would respond to an optical signal from an optical source (not shown), further responds to an external pressure generally indicated as P that causes a differential strain across the inner core 12, for providing a Bragg grating optical signal containing information about a birefringence of the Bragg grating that is proportional to the external pressure P. As shown, the external pressure P may be directed parallel, perpendicularly, or a combination thereof in relation to the axis A. The birefringence of the Bragg grating proportional to the external pressure is independent of a change in temperature. The birefringence is caused by the optical signal being reflected by closer spaced gratings on one side of the waveguide 60 than on the other side in response to the pressure change.

The scope of the invention is not intended to be limited to any particular dimension or shape of the side holes 62, 64 and a person skilled in the art would appreciate without undue experimentation the necessary dimensioning thereof to maintain the anti-buckling strength of the large diameter optical waveguide 60 and achieve the desired differential splitting effect. The scope of the invention is intended to include embodiments in which the side holes 62, 64 are filled with a suitable material or fluid, as well as embodiments in which the side holes 62, 64 are not filled with a suitable material or fluid.

In FIG. 1, the side holes 62, 64 are shown plugged with blocks 80 for the case where the side holes 62, 64 extend completely through the large diameter optical waveguide 60; however, embodiments are envisioned in which the side holes 62, 64 extend only partially through the large diameter optical waveguide 60 so one set of blocks would not be needed.

FIGS. 2: Pressure Transducer Having Side Holes With Same Diameter

FIG. 2 shows an alternative embodiment of the pressure sensor, wherein a large diameter optical waveguide 70 has an inner core 12 with a Bragg grating 14 therein and surrounded by a cladding 16 having two side holes 72, 74. The side holes 72, 74 are symmetrically located on either side of the core 12 and have substantially the same diameter.

In this embodiment, the side holes 72, 74 are filled with fluids 76, 78, each having a different bulk modulus of compressibility, which causes a differential splitting action of the large diameter optical waveguide 70 in response to an external pressure P. Similar to that discussed above, the side $S_1$ having the side hole 72 with the lower bulk modulus of compressibility will axially compress along the longitudinal axis A of the large diameter optical waveguide 70 a larger distance than the side $S_2$ having the side hole 74 with the smaller bulk modulus of compressibility. In the embodiment shown, the fluids 76, 78 in side holes 72, 74 are the same substance, but the fluid 76 in the side hole 72 has bubbles introduced therein, lowering the bulk modulus of compressibility, while the fluid 78 in the side hole 74 does not have bubbles introduced therein. The scope of the invention is not limited to using the same fluid with and without bubbles, because embodiments are envisioned in which different fluids or materials with different bulk moduli of compressibility are used.

Similar to that discussed above, the reason for this differential compression is that the side $S_1$ with the bubbles has a lower bulk modulus of compressibility than the side $S_2$, because the side $S_1$ has less material since more was removed to create the side hole 72, while the top and bottom sides have no material removed. The differential splitting between the two sides $S_1$, $S_2$ causes the core 12 and the Bragg grating 14 therein to bow in response to a pressure change exerted on the large diameter optical waveguide 70.

For example, in operation the large diameter optical waveguide 70 would respond to an optical signal from an optical source (not shown), further responds to an external pressure generally indicated as P that causes a differential strain across the inner core 12, for providing a Bragg grating optical signal containing information about a birefringence of the Bragg grating that is proportional to the external pressure P. As shown, the external pressure P may be directed parallel, perpendicularly, or a combination thereof in relation to the axis A. The birefringence of the Bragg grating 14 proportional to the external pressure is independent of a change in temperature. The birefringence is caused by the optical-signal being reflected by closer spaced gratings on one side of the waveguide 70 than on the other side in response to the pressure change.

The scope of the invention is not intended to be limited to any particular dimension of the side holes 72, 74, or fluids or materials used therein, and a person skilled in the art would appreciate without undue experimentation the necessary dimensioning thereof to maintain the anti-buckling strength of the large diameter optical waveguide 70 and achieve the desired differential splitting effect.

In FIG. 2, the side holes 72, 74 are shown plugged with blocks 80 for the case where the side holes 72, 74 extend completely through the large diameter optical waveguide 70; however, embodiments are envisioned in which the side holes 72, 74 extend only partially through the large diameter optical waveguide 70 so one set of blocks would not be needed.

The scope of the invention is not intended to be limited to the size or shape of the side holes, nor the kind or type of fluid(s) contained therein. Embodiments are envisioned using air/air, air/liquid, liquid/liquid, etc.

Figure 3:
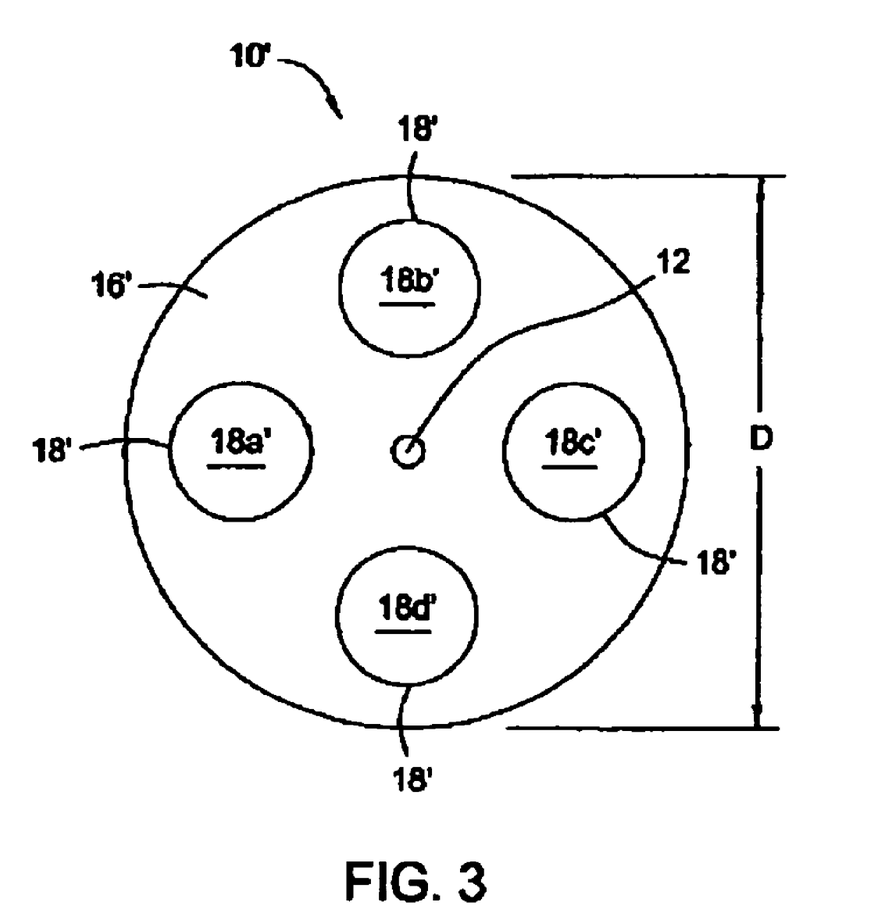
FIG. 3 is a diagram of a large diameter optical waveguide having four side holes that is a part of the subject matter of the present invention.

FIG. 3: Four Side Holes

The scope of the invention is intended to include embodiments having more than two side holes. For example, FIG. 3 shows a large diameter optical waveguide or cane 10' having the structural configuration generally indicated as 18' that includes four side holes 18a', 18b', 18c', 18d' symmetrically arranged in a cladding 16' about the inner core 12. The four side holes 18a', 18b', 18c', 18d' may extend completely or partially through the large diameter optical waveguide 10'. The four side holes 18a', 18b', 18c', 18d' provide for a reduced bulk modulus of compressibility, while the remaining material generally indicated as 20' in the cladding 16' surrounding the side holes 18a, 18b maintains the anti-buckling strength of the large diameter optical waveguide 10'. The scope of the invention is not intended to be limited to any particular dimension of the four side holes 18a', 18b', 18c', 18d' and a person skilled in the art would appreciate without undue experimentation the necessary dimensioning thereof to maintain the anti-buckling strength of the large diameter optical waveguide 10'.

Figure 4:
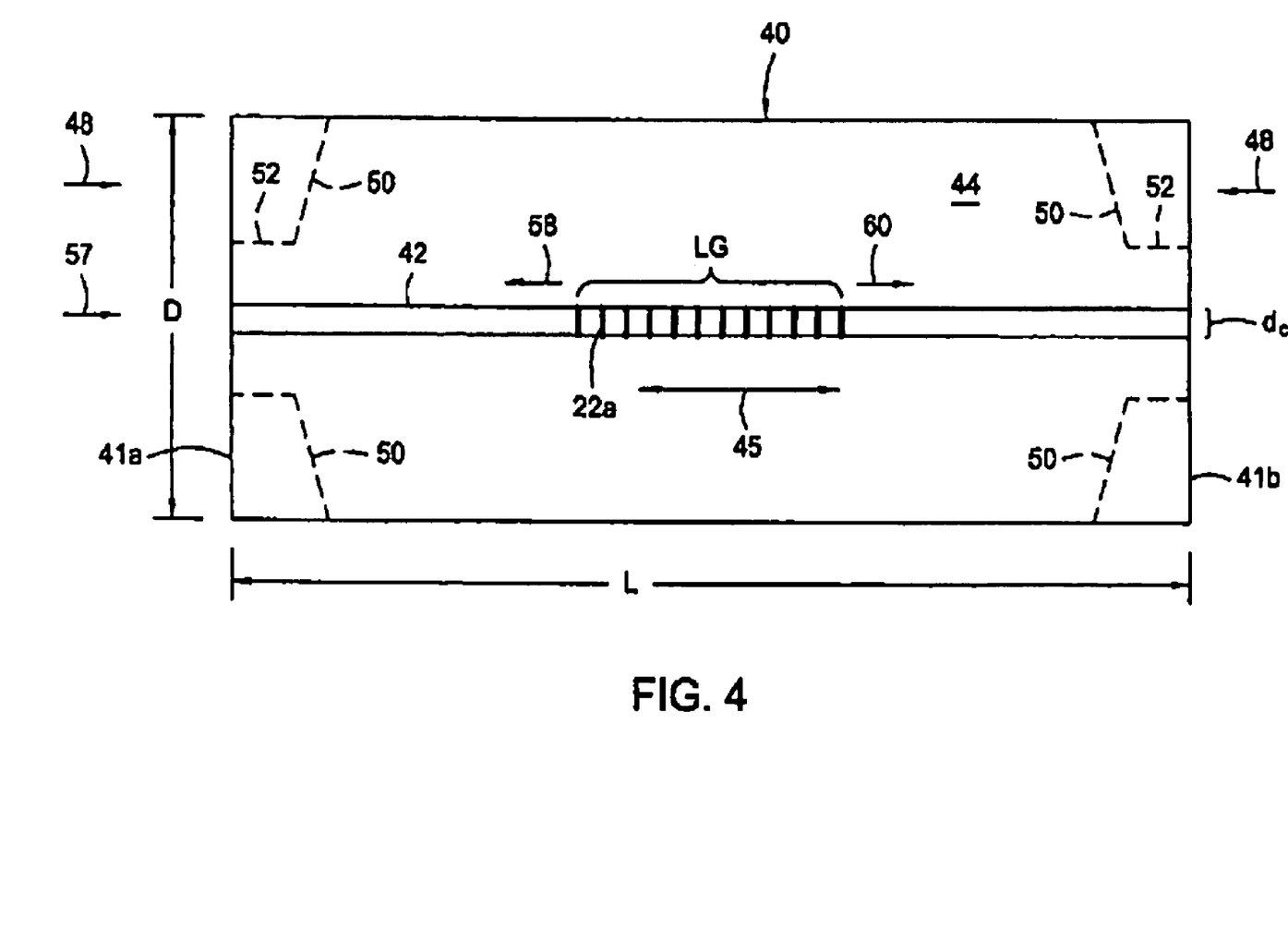
FIG. 4 is a diagram of a side view of a large diameter optical waveguide having a Bragg grating written therein that is a part of the subject matter of the present invention.

FIG. 4: The Large Diameter Optical Waveguide

FIG. 4 shows a side view of a large diameter optical waveguide generally indicated as 40 (also known as a "cane"), which is an example of the structure 16 (FIG. 1) discussed above in which the one or more side holes are provided. The large diameter optical waveguide 40 has an inner core 42 and an outer cladding 44 surrounding the inner core 42, opposing ends 41a, 41b, and a diameter D of at least about 0.3 millimeters, similar to that disclosed in the aforementioned co-pending U.S. patent application Ser. No. 09/455,868 (CC-0230), which is hereby incorporated by reference. The inner core 42 has a Bragg grating 22a written therein for tuning by applying a compressive force indicated by arrows 48 on the opposite ends 41a, 41b of the optical waveguide 40, or for sensing an external parameter like pressure applied thereon.

The large diameter optical waveguide 40 comprises silica glass ($SiO_2$) based material having the appropriate dopants, as is known, to allow light indicated by arrow 45 to propagate in either direction along the inner core 42 and/or within the large diameter optical waveguide 40. The inner core 42 has an outer dimension $d_c$ and the large diameter optical waveguide 40 has an outer dimension D. Other materials for the large diameter optical waveguide 40 may be used if desired. For example, the large diameter optical waveguide 40 may be made of any glass, e.g., silica, phosphate glass, or other glasses; or solely plastic.

The outer dimension D of the outer cladding 44 is at least about 0.3 millimeters; and the outer dimension $d_c$ of the inner core 42 is such that it propagates only a few spatial modes (e.g., less than about 6). For example for single spatial mode propagation, the inner core 42 has a substantially circular transverse cross-sectional shape with a diameter $d_c$ less than about 12.5 microns, depending on the wavelength of light. The invention will also work with larger or non-circular cores that propagate a few (less than about 6) spatial modes, in one or more transverse directions. The outer diameter D of the outer cladding 44 and the length L have values that will resist buckling when the large diameter optical waveguide 40 is placed in axial compression as indicated by the arrows 48.

The large diameter optical waveguide 40 may be ground or etched to provide tapered (or beveled or angled) outer corners or edges 50 to provide a seat for the large diameter optical waveguide 40 to mate with another part (not shown herein) and/or to adjust the force angles on the large diameter optical waveguide 40, or for other reasons. The angle of the beveled corners 50 is set to achieve the desired function. Further, the large diameter optical waveguide 40 may be etched or ground to provide nubs 52 for an attachment of a pigtail assembly 54 (not shown herein) to the large diameter optical waveguide 40. Further, the size of the large diameter optical waveguide 40 has inherent mechanical rigidity that improves packaging options and reduces bend losses.

In the large diameter optical waveguide 40, the Bragg grating 22a is impressed (or embedded or imprinted) therein. A Bragg grating 22a, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al.; and U.S. Pat. No. 5,388,173, entitled "Method and Apparatus for Forming Aperiodic Gratings in Optical Fibers", to Glenn, which are hereby incorporated by reference to the extent necessary to understand the present invention. The aperiodic variation of the gratings described herein may include a chirped grating. See also U.S. Pat. Nos. 5,042,897 and 5,061,032, both issued to Meltz et al., and hereby incorporated by reference in their entirety. As shown, the grating 22a is written in the inner core 42; however, the scope of the invention is intended to include writing the grating in the outer cladding 44, as well as a combination of the inner core 42 and the outer cladding 44. Any type of wavelength-tunable grating or reflective element embedded, etched, imprinted, or otherwise formed in the large diameter optical waveguide 40 may be used. The large diameter optical waveguide 40 may be photosensitive if the grating 22a is to be written into the large diameter optical waveguide 40. As used herein, the term "grating" means any of such reflective elements. Further, the reflective element (or grating) 22a may be used in reflection and/or transmission of light. The incoming light 57 incident on the grating 22a reflects a portion thereof as indicated by a line 58, and passes the remaining incident light 57 (within a predetermined wavelength range), as indicated by a line 60 (as is known).

The grating 22a has a grating length Lg, which is determined based on the application, and may be any desired length. A typical grating 22a has a grating length Lg in the range of about 3–40 millimeters. Other sizes or ranges may be used if desired. The length Lg of the grating 22a may be shorter than or substantially the same length as the length L of the large diameter optical waveguide 40. Also, the inner core 42 need not be located in the center of the large diameter optical waveguide 40 but may be located anywhere in the large diameter optical waveguide 40.

Accordingly, an outer diameter D of greater than about 400 microns (0.4 millimeters) provides acceptable results (without buckling) for a waveguide length L of 5 millimeters, over a grating wavelength tuning range of about 10 nm. For a given outer diameter D as the length L increases, the wavelength tuning range (without buckling) decreases. Other diameters D for the large diameter optical waveguide 40 may be used depending on the overall length L of the large diameter optical waveguide 40 and the desired amount of compression length change ΔL or wavelength shift Δλ.

The large diameter optical waveguide 40 may be made using fiber drawing techniques that provide the resultant desired dimensions for the core and the outer diameter discussed hereinbefore. As such, the external surface of the large diameter optical waveguide 40 will likely be optically flat, thereby allowing Bragg gratings to be written through the cladding similar to that which is done for conventional optical fiber. Because the large diameter optical waveguide 40 has a large outer diameter compared to that of a standard optical fiber (e.g., 125 microns), the large diameter optical waveguide 40 may not need to be coated with a buffer and then stripped to write the gratings, thereby requiring less steps than that needed for conventional optical fiber gratings. Also, the large outer diameter D of the large diameter optical waveguide 40 allows the waveguide to be ground, etched or machined while retaining the mechanical strength of the large diameter optical waveguide 40. The large diameter optical waveguide 40 is easily manufacturable and easy to handle, and may be made in long lengths (on the order of many inches, feet, or meters) then cut to size as needed for the desired application.

Also, the large diameter optical waveguide 40 does not exhibit mechanical degradation from surface ablation common with optical fibers under high laser fluency (or power or intensity) during grating exposure (or writing). In particular, the thickness of the cladding between the cladding outer diameter and the core outer diameter causes a reduced power level at the air-to-glass interface for a focused writing beam.

The large diameter optical waveguide also reduces coupling between the core and cladding modes due to the increased end cross-sectional area between the core and cladding of the waveguide. Thus, the gratings 22a written in the inner core 42 of the large diameter optical waveguide 40 exhibit less optical transmission loss and exhibits a cleaner optical profile than a conventional fiber grating because the large cladding region dissipates coupled cladding modes, thereby reducing the coupling of the inner core 42 to the outer cladding 44 modes. In general, the greater the difference in the cross-sectional area between the inner core 42 and the outer cladding 44 the smaller the mode field overlap and the lower the coupling to the cladding modes. The thickness of the outer cladding 44 between the cladding outer diameter and the core outer diameter may be set to optimize this effect. Other diameters of the inner core 42 and the large diameter optical waveguide 40 may be used if desired such that the cladding modes are reduced to the desired levels.

The large diameter optical waveguide 40 may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

There are known methods for making such a large diameter optical waveguide with side holes, and the scope of the invention is not intended to be limited to any particular way to make the same. For example, one way to make the large diameter optical waveguide is to drill holes in the preform then draw the large diameter optical waveguide. There are also known techniques for putting holes in 125 micron fiber that may also be used.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein.

For example, although the invention is described in relation to long period gratings, the inventors envision other embodiments using blazed gratings, periodic or aperiodic gratings, or chirped gratings.

Although the invention has been described and illustrated with respect to exemplary embodiments thereof, the foregoing and various other additions and omissions may be made therein without departing from the spirit and scope of the present invention.

What is claimed is:

1. A pressure transducer having a large diameter optical waveguide with a cross-section of at least about 0.3 millimeters, at least one inner core, a Bragg grating arranged therein, a cladding surrounding the at least one inner core, and a structural configuration for reducing the bulk modulus of compressibility and maintaining the anti-buckling strength of the large diameter optical waveguide, wherein the large diameter optical waveguide responds to an optical signal, further responds to an external pressure that causes a differential strain across the inner core, for providing a Bragg grating optical signal containing information about a birefringence of the Bragg grating that is proportional to the external pressure, wherein the structural configuration forms at least one side hole arranged in relation to the core of the large diameter optical waveguide and dimensioned for maintaining anti-buckling strength of the large diameter optical waveguide.

2. A pressure transducer according to claim 1, wherein the thermal effects on the large diameter optical waveguide cause a common-mode shift in the Bragg wavelength so as to sense pressure Independent of the effects in temperature change.

3. A pressure transducer according to claim 1, wherein the at least one side hole includes two or more side holes symmetrically arranged about the inner core.

4. A pressure transducer according to claim 1, wherein the at least one side hole extends completely through the large diameter optical waveguide.

5. A pressure transducer according to claim 1, wherein the at least one side hole extends partially through the large diameter optical waveguide.

6. A pressure transducer according to claim 1, wherein the at least one side hole is non-circular.

7. A pressure transducer according to claim 1, wherein the structural configuration is formed in the cladding.

8. A pressure transducer according to claim 3, wherein the two side holes have different diameters forming an asymmetrical large diameter optical waveguide structure.

9. A pressure transducer according to claim 8, wherein the two side holes are symmetrically located an either side of the core.

10. A pressure transducer according to claim 9, wherein the birefringence of the Bragg grating proportional to the external pressure is independent of a change in temperature.

11. A pressure transducer according to claim 1, wherein the two side holes have substances or material with different coefficients of compressibility.

12. A pressure transducer according to claim 11, wherein one of the two side holes has a first fluid with one coefficient of compressibility, and the other of the two side holes has a second fluid with a different coefficient of compressibility.

13. A pressure transducer according to claim 11, wherein the one of the two side holes has a fluid with air bubble therein for reducing the coefficient of compressibility of the substance, and the other of the two side holes has the same type of fluid without air bubbles.

14. A pressure transducer according to claim 11, wherein the large diameter optical waveguide responds to an optical signal, further responds to a change in pressure on the substances in the two side holes that causes a differential strain across the inner core, for providing a Bragg grating optical signal containing information about a birefringence of the Bragg grating that is proportional to the change in the pressure.

15. A pressure transducer according to claim 14, wherein the birefringence of the Bragg grating proportional to the pressure is independent of a change in temperature.

16. A pressure transducer according to claim 1, wherein the structural configuration forms two side hoses arranged in relation to the core of the large diameter optical-waveguide and having the same diameter.

17. A pressure transducer, comprising;

a large diameter optical waveguide with a cross-section of at least about 0.3 millimeters, the large diameter optical waveguide comprising:

an inner core;

a Bragg grating arranged in the inner core; and a cadding surrounding the inner core, wherein a side hole is disposed in the cladding and is dimensioned for maintaining anti-buckling strength of the large diameter optical waveguide while reducing the bulk modulus of compressibility of the large diameter optical waveguide, wherein the large diameter optical waveguide is responsive to an optical signal and further responsive to an external pressure that causes a differential strain across the inner core, thereby providing a Bragg grating optical signal containing information about a birefringence of the Bragg grating that is proportional to the external pressure.

* * * * *

UNITED STATES PATENT AND TRADEMARK OFFICE
CERTIFICATE OF CORRECTION

PATENT NO.         : 7,155,074 B2                                                    Page 1 of 1
APPLICATION NO. : 10/458795
DATED              : December 26, 2006
INVENTOR(S)        : Alan D. Kersey It is certified that error appears in the above-identified patent and that said Letters Patent is hereby corrected as shown below:

In Column 8, Claim 2, Line 41, please delete "Independent" and insert --independent--;

In Column 9, Claim 16, Line 22, please delete "hoses" and insert --holes--;

In Column 9, Claim 16, Line 23, please delete "optical-waveguide" and insert --optical waveguide--.

Signed and Sealed this

Tenth Day of July, 2007

JON W. DUDAS
*Director of the United States Patent and Trademark Office*